United States Patent
Zalbide Aguirrezabalaga et al.

(10) Patent No.: US 10,452,965 B2
(45) Date of Patent: Oct. 22, 2019

(54) RADIO FREQUENCY IDENTIFICATION (RFID) TAG AND A METHOD OF MONITORING QUALITY OF SERVICE (QOS) OF A RFID TAG

(71) Applicant: FARSENS, S.L., Gipuzkoa (ES)

(72) Inventors: Ibon Zalbide Aguirrezabalaga, Guipuzcoa (ES); Daniel Pardo Sanchez, Guipuzkoa (ES); Andoni Beriain Rodriguez, Guipuzkoa (ES); Ainara Jimenez Irastorza, Guipuzkoa (ES); Inaki Galarraga Martin, Guipuzcoa (ES); Roque Jose Berenguer Perez, Guipuzcoa (ES); Aritz Alonso Domingo, Guipuzcoa (ES); Ezequiel Navarro Perez, Antequera (ES)

( * ) Notice: Subject to any disclaimer, the term of this patent is extended or adjusted under 35 U.S.C. 154(b) by 0 days.

(21) Appl. No.: 16/304,448

(22) PCT Filed: May 12, 2017

(86) PCT No.: PCT/IB2017/000556
§ 371 (c)(1),
(2) Date: Nov. 26, 2018

(87) PCT Pub. No.: WO2017/203340
PCT Pub. Date: Nov. 30, 2017

(65) Prior Publication Data
US 2019/0156170 A1 May 23, 2019

(30) Foreign Application Priority Data
May 26, 2016 (EP) .................................. 16001200

(51) Int. Cl.
*G06K 19/07* (2006.01)
*H04B 17/318* (2015.01)
*G06K 7/00* (2006.01)

(52) U.S. Cl.
CPC ....... *G06K 19/0709* (2013.01); *G06K 7/0008* (2013.01); *G06K 19/0704* (2013.01); *G06K 19/0716* (2013.01); *H04B 17/318* (2015.01)

(58) Field of Classification Search
CPC ............ G06K 19/0709; G06K 7/0008; G06K 19/0704; G06K 19/0716
(Continued)

(56) References Cited

U.S. PATENT DOCUMENTS

| 6,899,277 B2 * | 5/2005 | Kawano | G06K 7/0004 235/375 |
| 2006/0017544 A1 * | 1/2006 | Tanaka | G06K 7/0008 340/10.2 |

(Continued)

FOREIGN PATENT DOCUMENTS

WO 2014/121338 A1 8/2014

*Primary Examiner* — Ojiako K Nwugo
(74) *Attorney, Agent, or Firm* — Eugenio J. Torres-Oyola; Victor M. Rodriguez-Reyes; Ferraiuoli LLC

(57) ABSTRACT

A radio frequency identification (RFID) tag and a method of monitoring Quality of Service (QoS) of a RFID tag
The RFID tag (200) comprising: a first communication module (201) to receive signals from a RFID reader (100) and including means for extracting energy from the received signals providing a supply voltage Vdd to the RFID tag (200); an energy storage module (203) to store said extracted energy from the received signals of the RFID reader (100); a second communication module (202) to communicate with an external device (300); a power output (204) to provide a power-supply voltage to the external device (300) using said stored energy; a control module (205) to perform a tracking of said power-supply voltage provided by said power output
(Continued)

(204), wherein the first communication module (201) also transmits to the RFID reader (100) a quality indicator of an energy status of the RFID tag (200) based on the result of said tracking.

14 Claims, 3 Drawing Sheets

(58) Field of Classification Search
USPC .......................... 340/10.1–10.5, 572.1–572.9
See application file for complete search history.

(56) References Cited

U.S. PATENT DOCUMENTS

| | | | |
|---|---|---|---|
| 2006/0186999 A1* | 8/2006 | McLaughlin | G06K 7/0008 340/10.51 |
| 2006/0202821 A1* | 9/2006 | Cohen | G01K 1/024 340/539.27 |
| 2008/0018467 A1* | 1/2008 | Estevez | G08B 13/14 340/572.1 |
| 2008/0174410 A1* | 7/2008 | Sarangapani | G06K 7/0008 340/10.4 |
| 2008/0297312 A1* | 12/2008 | Moshfeghi | H04L 47/10 340/10.1 |
| 2012/0194322 A1* | 8/2012 | Batra | G06K 7/0008 340/10.33 |
| 2017/0131222 A1* | 5/2017 | Zalbide Agirrezabalaga | G01D 4/002 |

\* cited by examiner

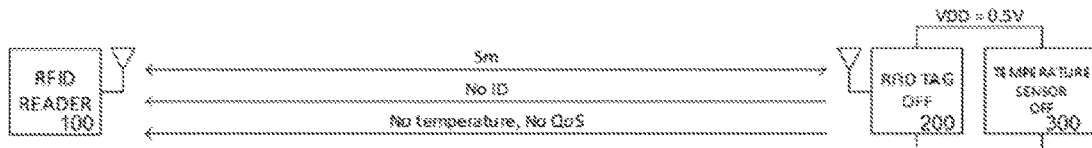
Fig.3A
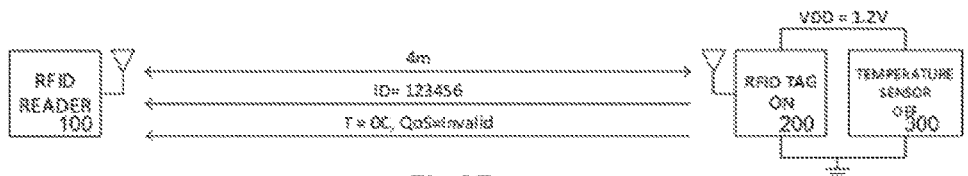
Fig.3B
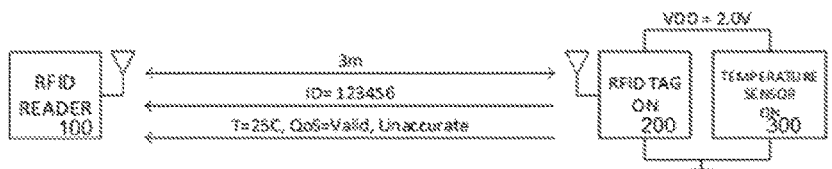
Fig.3C
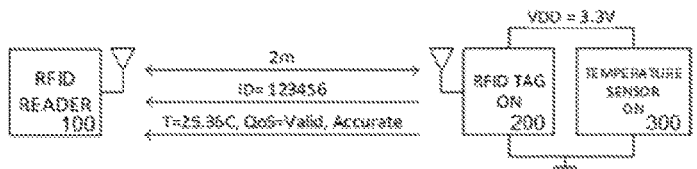
Fig.3D
Fig. 3
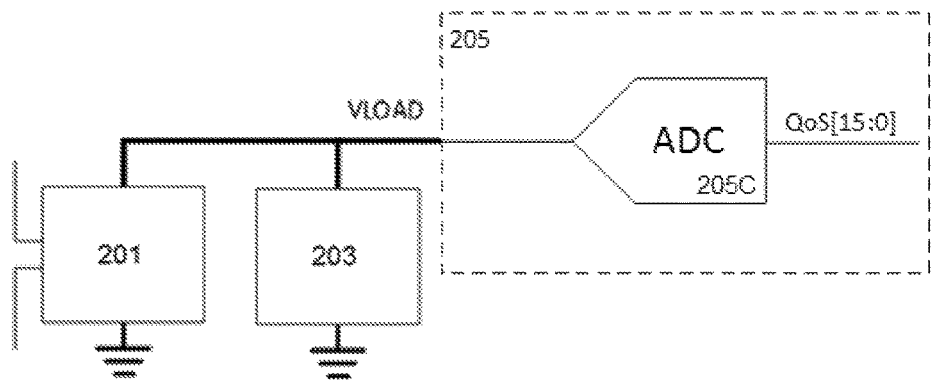
Fig. 4

RADIO FREQUENCY IDENTIFICATION (RFID) TAG AND A METHOD OF MONITORING QUALITY OF SERVICE (QOS) OF A RFID TAG

TECHNICAL FIELD

The present invention is directed, in general, to the field of radio frequency identification technology. In particular, the invention relates to a radio frequency identification (RFID) tag and to a method of monitoring Quality of Service (QoS) of a RFID tag.

BACKGROUND OF THE INVENTION

Almost every communication system includes the Quality of Service (QoS) concept in order to ensure proper communication between emitter and receiver. Even in RFID communication, the communication protocol defines CRC codes in order to check data consistency and retrials if corrupt data is received. Most RFID readers also implement RSSI reading in order to evaluate the strength of the communication link with an RFID tag.

All these QoS services are generally oriented to the communication link between the RFID reader and the RFID tag, which is the main issue in active communication systems. Battery powered systems may also include some battery level indicator in order to alert an end user when the battery has to be changed. However, this value is not related to the validity of the information it is transmitting.

Passive systems on the other hand have an additional requirement: the power transmission from RFID reader to RFID tag. If a passive RFID tag responds to the RFID reader, it is assumed that the RFID tag is powered and capable of working. However, if an external device (or load) such as a sensor or an actuator is connected to and powered from the RFID tag, the quality of the power-supply delivered to the external device is unknown. Even if this delivered power-supply is outside the required value, the RFID tag may respond to the RFID reader with uncertain or invalid information.

In such a case, the RFID reader may obtain a response from the RFID tag which may be correct from said communication link point of view, but the data included in the response may be incorrect given that the external device may have been powered with improper supply conditions.

Present invention is focused on solving such a technical problem.

There are known some patents or patent application in this technical field.

For instance, European patent EP-B1-2709041 discloses a system, and a corresponding method, for monitoring the state of health of a RFID tag. The system comprises a reader device operable to read data from said RFID tag, wherein said reader device is arranged to determine the state of health of the RFID tag by reading a parameter value indicative of said state of health from the RFID tag. In contrast to the proposed invention, the RFID tag of this patent it is not configured to power-supply an external device such as a sensor or an actuator, nor it is able to monitor said power-supply in order to know an energy state of the RFID tag.

US-A1-2008100455 provides an identification device tag including a semiconductor chip; an antenna coupled to the semiconductor chip; a layer of material, coupled to the semiconductor chip, and adapted to provide a persistent visual or audible signal that is observable by a human being; and a controller coupled to the layer of material and adapted to cause the material to provide the signal. The identification device tag may be adapted to store one or more bits indicating whether a part to which the identification device tag is coupled is included in a subset of parts in order a reader being aware of that.

US-A1-2009235106 discloses a method for determining the power supply requirements of a data processing system, wherein the data processing system is associated with a plurality of field replaceable units. The method comprises identifying, from an electronic label associated with a field replaceable unit, a unique identifier and a power supply requirement of the field replaceable unit; identifying an electronic enclosure label associated with a data processing system; associating the electronic label of a field replaceable unit with the electronic enclosure label of the data processing system; instructing the electronic enclosure label to calculate the power supply requirement of the data processing system from the identified power supply requirement of the associated field replaceable unit associated with the electronic label.

However, none of the above-mentioned patents or patent applications addresses and solves the above mentioned technical problem.

DESCRIPTION OF THE INVENTION

Embodiments of the present invention provide in accordance with a first aspect a radio frequency identification (RFID) tag, that as commonly in the field comprises: a first communication module adapted and configured to receive signals from a RFID reader, said first communication module including means for extracting energy from the received signals providing a supply voltage Vdd to the RFID tag; at least one energy storage module in connection with and supplied by the first communication module adapted and configured to store said extracted energy from the received signals of the RFID reader; a second communication module adapted and configured to communicate with at least one external device; and a power output in connection with and supplied by the second communication module adapted and configured to provide a power-supply voltage to said external device using said stored energy.

Different to the known proposals, the RFID tag further comprises a control module in connection with the first communication module and the second communication module. The control module is adapted and configured to perform a tracking of said power-supply voltage provided by said power output to the external device (e.g. a temperature sensor, a pressure sensor, among other types of sensors).

In addition, in the proposed RFID tag the first communication module is further adapted and configured to transmit to the RFID reader a quality indicator of an energy status of the RFID tag based on the result of said tracking. So with this information, the RFID reader may decide how to proceed. Depending on the supply condition of the RFID tag the RFID reader may accept or ignore the response thereof.

Therefore, the mentioned tracking will recover the voltage conditions of said external device during any moment of the period it has been powered to perform a specific task (taking of a temperature, measuring a pressure, etc.), and this information, packed with the obtained measure, and transmitted to the RFID reader (including the worst voltage case) can be used by the RFID reader to appraise whether the obtained measure is acceptable or not.

According to the invention, the RFID tag may be passive, i.e. it does not include a battery and it depends on the strength of the RFID reader signal to cause to generate a response, or alternatively it may be semi-passive, i.e. it operates similarly to the passive tag, using the reader signal to cause a response from the tag, however in this case the semi-passive tag does have a battery for sensing or other functions, but not for data transmission.

According to an embodiment, the control module comprises two electronic comparators. The first one of the electronic comparators is configured to determine if the provided power-supply voltage is over (or equal) a minimum voltage threshold value that can be required by the external device. The second one of the electronic comparators is configured to determine if the provided power-supply voltage is over (or equal) a maximum voltage threshold value than can be required by the external device.

The minimum voltage threshold value when the external device is a temperature sensor is preferably comprised within a range of 1.6 to 1.9 V and the maximum voltage threshold value is preferably comprised within a range of 2.8 to 3.2 V. More preferably, the minimum voltage threshold value is 1.8 V and the maximum voltage threshold value is 3V.

Alternatively, the control module comprises an Analog to Digital converter (ADC) to determine the power-supply voltage provided to the external device.

According to an embodiment, the control module continuously performs (i.e. uninterruptedly) said tracking of the power-supply voltage. Alternatively, according to another embodiment, the control module performs said tracking to the power-supply voltage periodically, every certain period of time.

Embodiments of the present invention also provide in accordance with a second aspect a method of monitoring Quality of Service (QoS) of a RFID tag. The method comprises receiving, by a first communication module of said RFID tag, signals from a RFID reader, and extracting from the received signals energy providing a supply voltage Vdd to the RFID tag; storing in at least one energy storage module of the RFID tag said extracted energy from the received signals of the RFID reader; providing via a power output in connection with and supplied by a second communication module of the RFID tag a power-supply voltage to at least one external device using said stored energy; tracking, by a control module of the RFID tag in connection with the second communication module and with the first communication module, the power-supply voltage provided by the power output to the external device; and transmitting via the first communication module to the RFID reader a quality indicator of an energy status of the RFID tag based on the result of said tracking.

BRIEF DESCRIPTION OF THE DRAWINGS

The previous and other advantages and features will be more fully understood from the following detailed description of embodiments, with reference to the attached figures, which must be considered in an illustrative and non-limiting manner, in which:

FIG. 3 illustrates different embodiments of a RFID tag situated at different distances from a RFID reader.

FIG. 4 illustrates another embodiment of the control module of the RFID tag of FIG. 1. According to this embodiment, the control module includes an ADC for performing said tracking.

DETAILED DESCRIPTION OF PREFERRED EMBODIMENTS

Figure 1:
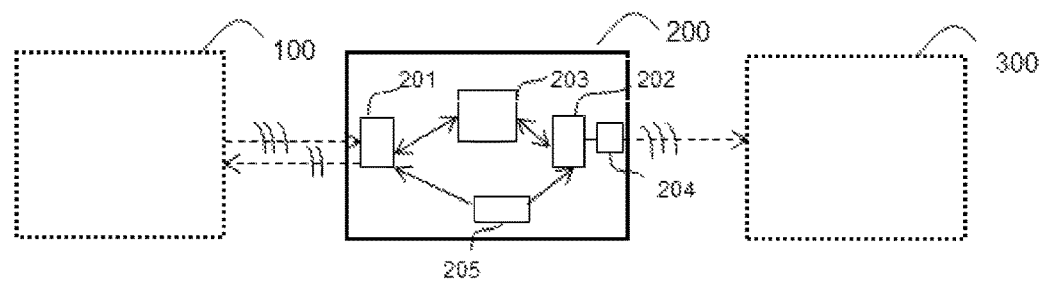
FIG. 1 is a schematic illustration of the proposed RFID tag according to a preferred embodiment of the present invention.

FIG. 1 shows a preferred embodiment of the proposed radio frequency identification (RFID) tag. According to this particular embodiment, the RFID tag 200 is a passive RFID tag, i.e. the RFID tag does not include a battery, and includes two communication modules 201 and 202 (or first and second communication modules respectively), each one being operatively connected to an energy storage module 203 such as a capacitor. A power output 204 in connection with and supplied by the second communication module 202 is also included.

The first communication module 201 is configured to receive signals such as UHF RF signals from a RFID reader 100 (also illustrated in the figure), to that end, the first communication module 201 includes means for extracting energy from the signals received from the RFID reader 100 providing a supply voltage Vdd to the RFID tag 200. The energy extracted from the received signals from the RFID reader 100 is stored by the energy storage module 203, i.e. the capacitor is charged. The supply voltage Vdd depends on the distance between the RFID reader 100 and the RFID tag 200.

The second communication module 202 is provided for the communication with at least one external device 300, in this particular example a temperature sensor, which is specified to work in this example properly between 1.8V and 3.6V, and the power output 204 is provided for driving said external device 300 from the energy harvested (i.e. stored) by the RFID tag 200. The accuracy of the external device 300 depends on the provided power-supply voltage. If the power-supply voltage is over 3V the accuracy of the external device 300 is of 0.01° C., meanwhile if the power-supply voltage is below 3V the accuracy is of 1° C.

The proposed RFID tag 200 to track the power-supply voltage provided to the external device 300 further includes a control module 205 which is in connection with both of the communication modules 201, 202.

Figure 2:
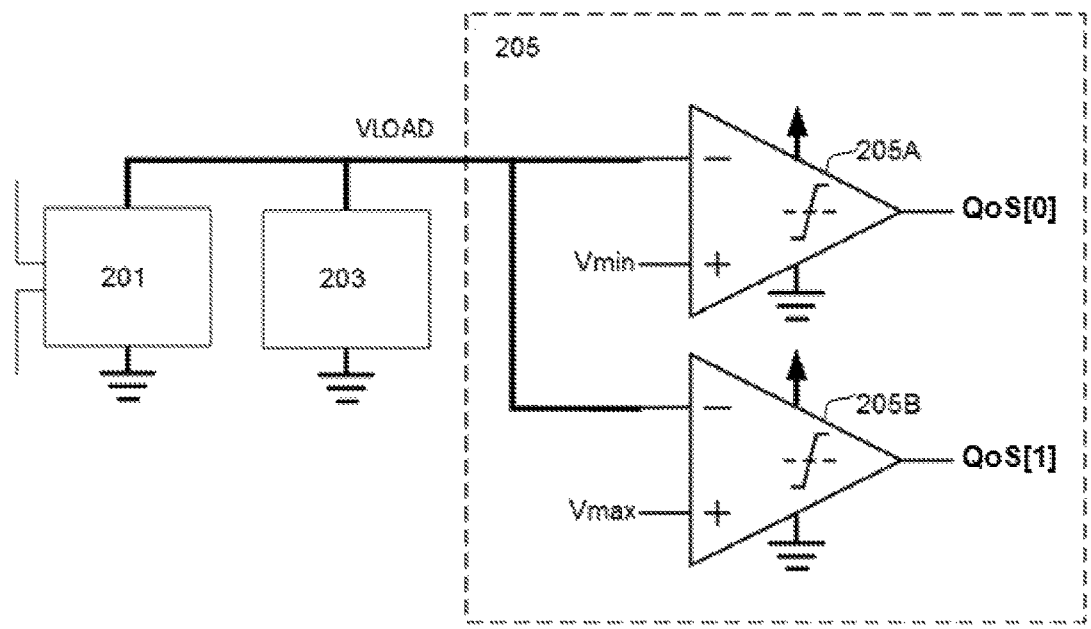
FIG. 2 illustrates an embodiment of the control module of the RFID tag of FIG. 1. According to this embodiment, the control module includes two electronic comparators for performing a tracking of a power-supply voltage provided by the RFID tag to an external device.

FIG. 2 illustrates an embodiment of the control module 205. According to this embodiment, the control module 205 comprises two electronic comparators 205A and 205B in order to determine if the power-supply voltage provided to the external device 300 is over (or in some embodiments also equal) a minimum voltage threshold value Vmin required by the external device 300 (for instance comprised within a range of 1.6 to 1.9V) or over (or in some embodiments also equal) a maximum voltage threshold value Vmax required by the external device 300 (for instance comprised within a range of 2.8 to 3.2V). Preferably, the minimum voltage threshold value Vmin is 1.8 V and the maximum voltage threshold value Vmax is 3V.

The outputs of the electronic comparators 205A, 205B, which are connected to a digital processor of the RFID tag 200 (not illustrated for simplicity of the figures), are included in the answer (for instance by including a series of bits) from the RFID tag 200 to the RFID reader 100 when transmitting to the RFID reader 100 the data about the external device 300, so providing a quality indicator of an energy status of the RFID tag 200.

As said before, the supply voltage Vdd whereby the RFID tag 200 is powered and working depends on the distance between the RFID reader 100 and the RFID tag 200. FIG. 3 shows different embodiments with different distances between the RFID reader 100 and RFID tag 200. The external device 300 of these embodiments is also a temperature sensor. In FIG. 3A, the distance between the RFID reader 100 and RFID tag 200 is of 5 meters, obtaining a supply voltage Vdd of 0.5V, which is not enough to power up the RFID tag 200 or the external device 300. Consequently, no data is received in the RFID reader 100. In FIG. 3B, the distance between the RFID reader 100 and RFID tag 200 is of 4 meters obtaining a supply voltage Vdd of 1.2V. This supply voltage Vdd is enough for the RFID tag 200 to start working; however, it is not enough to power up the external device 300. As the first communication link 201 is working, data regarding the RFID tag 200 (ID as termed in the figure) and the external device 300 (temperature) can be retrieved from the RFID reader 100. The quality indicator provided by the RFID tag 200 is used to notify the RFID reader 100 that the data is invalid as the power-supply voltage value is below the minimum. In FIG. 3C, the distance between the RFID reader 100 and RFID tag 200 is set to 3 m, obtaining a supply voltage of 2.0V. This supply voltage Vdd is high enough to power up both, the RFID tag 200 and the external device 300; however, the external device 300 under this scenario will be operating with low accuracy as the power-supply voltage is lower than the maximum voltage threshold value Vmax. The quality indicator provided by the RFID tag 200 (i.e. the series of bits included in the answer from the RFID tag 200 to the RFID reader 100 indicative of the power-supply voltage provided to the external device 300) notifies the RFID reader 100 of this situation. Finally, in FIG. 3D the distance between the RFID reader 100 and RFID tag 200 is of 2 m, so that the obtained supply voltage VDD is of 3.3V. In this case both RFID tag 200 and the external device 300 are powered up, and moreover, the external device 300 is working with high accuracy. The quality indicator provided by the RFID tag 200 to the RFID reader 100 will notify the RFID reader 100 of this favorable situation.

Even though in the above-describe embodiments the external device 300 is a temperature sensor, the RFID tag 200 in alternative embodiments may power up any other type of sensor or actuator 300, such as a pressure sensor, a humidity sensor, etc. According to these alternative embodiments, the values of the minimum and maximum voltage threshold values Vmin and Vmax will depend on the sensor or actuator used.

Referring now to FIG. 4, therein it is illustrated another embodiment of the control module 205. According to this embodiment, the control module 205 comprises an Analog to Digital converter (ADC) 205C to determine the power-supply voltage provided to the external device 300. Different to the embodiment of FIG. 2, in this case the output of the ADC 205C indicates the value of said provided power-supply voltage with certain precision. This value will be included in the answer from the RFID tag 200 to the RFID reader 100 to provide the quality indicator of an energy status of the RFID tag 200.

Other different implementation of the control module 205 may be also implemented without departing from the scope of protection of present invention.

Figure 5:
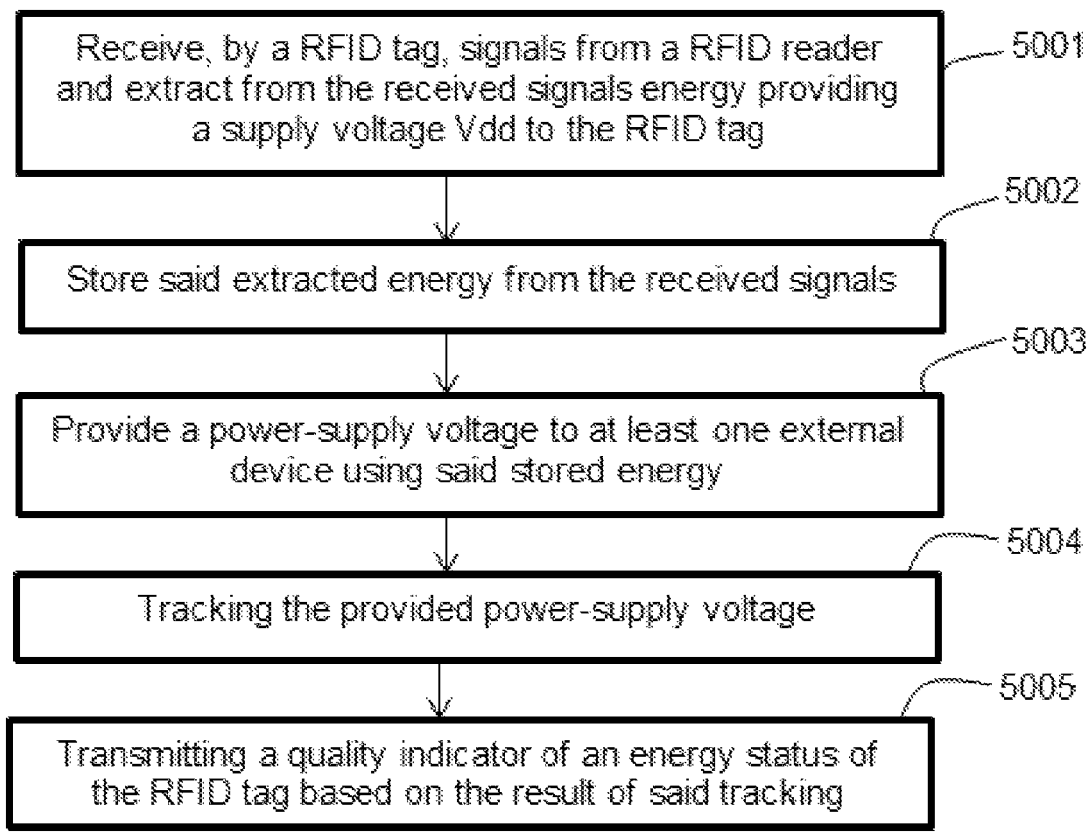
FIG. 5 is a flow chart illustrating a method of monitoring QoS of a RFID tag according to an embodiment of the present invention.

Referring now to FIG. 5, therein it is illustrated an embodiment of a method of monitoring QoS of a RFID tag 200, either a passive or a semi-passive RFID tag. According to this method, at step 5001, a RFID tag 200 receives signals from a RFID reader 100 and extracts from the received signals energy providing a supply voltage Vdd to the RFID tag 200. Then, at step 5002, the RFID tag 200 stores said extracted energy from the received signals of the RFID reader 100. With the stored energy, step 5003, the RFID tag 200 powers up an external device 300 such as a sensor or an actuator. Then, at step 5004, the power-supply voltage provided to the external device 300 is tracked. Finally, at step 5005, a quality indicator of an energy status of the RFID tag 200 (e.g. implemented as a series of bits) based on the result of said tracking is transmitted to the RFID reader 100. The transmission of the quality indicator is performed, according to an embodiment, in compliance with current C1G2 standard. It should be noted that other communication standards or even proprietary or custom commands could be also used for transmitting the quality indicator to the RFID reader 100.

The tracking of the power-supply voltage provided to the external device 300 may be either continuously or periodically performed by a control module 205 of the RFID tag 200.

According to another embodiment, in this case not illustrated, the RFID tag 200 is a semi-passive RFID tag. In this case, besides the elements of the embodiments of FIGS. 1 and 2 or 4, the RFID tag further includes a battery for sensing or other functions, but not for data transmission.

The RFID tag 200 can be further improved by integrating an additional sensor, such as a temperature sensor or humidity sensor (among other environment sensors), not illustrated in the figures, so that ambient temperature or humidity of the RFID tag 200 and of the external device 300, if the latter is located in proximity allowing said transfer of power supply, can be also tracked. In this manner, any value received from the external device (for instance a pressure value) will be packed with: voltage and ambient temperature during the period in which the measure has been performed.

The scope of the present invention is defined in the attached claims.

The invention claimed is:

1. A radio frequency identification (RFID) tag, said RFID tag comprising:
    a first communication module adapted and configured to receive signals from a RFID reader, said first communication module including an element for extracting energy from the received signals providing a supply voltage Vdd to the RFID tag;
    at least one energy storage module in connection with and supplied by the first communication module adapted and configured to store said extracted energy from the received signals of the RFID reader;
    a second communication module adapted and configured to communicate with at least one external device; and
    a power output in connection with and supplied by the second communication module adapted and configured to provide a power-supply voltage to said at least one external device using said stored energy;
    a control module in connection with the second communication module, said control module being adapted and configured to perform a tracking of said power-supply voltage provided by said power output to the at least one external device, the control module being further in connection with the first communication module
    wherein the first communication module being further adapted and configured to transmit to the RFID reader a quality indicator of an energy status of the RFID tag based on a result of said tracking.

2. The RFID tag of claim 1, wherein the control module comprises two electronic comparators, a first one of said two electronic comparators being configured to determine if the provided power-supply voltage is over or equal a minimum voltage threshold value that can be required by the at least one external device, and a second one of said two electronic comparators being configured to determine if the provided power-supply voltage is over or equal a maximum voltage threshold value than can be required by the at least one external device.

3. The RFID tag of claim 2, wherein the at least one external device is a temperature sensor, and wherein said minimum voltage threshold value is comprised within a range of 1.6 to 1.9 V and said maximum voltage threshold value is comprised within a range of 2.8 to 3.2 V.

4. The RFID tag of claim 3, wherein the minimum voltage threshold value is 1.8 V and the maximum voltage threshold value is 3V.

5. The RFID tag of claim 1, wherein the control module comprises an Analog to Digital converter, ADC, to determine the power-supply voltage provided to the external device.

6. The RFID tag of claim 1, wherein the control module is configured to continuously perform said tracking.

7. The RFID tag of claim 1, wherein the control module is configured to periodically perform said tracking.

8. The RFID tag of claim 1, comprising a passive RFID tag.

9. The RFID tag of claim 1, comprising a semi-passive RFID tag, the RFID tag further comprising a battery.

10. The RFID tag of claim 1, further comprising at least one temperature sensor or humidity sensor adapted and configured to monitor an ambient temperature or humidity of an area surrounding the RFID tag.

11. A method of monitoring Quality of Service (QoS) of a radio frequency identification (RFID) tag, comprising:
  receiving, by first communication module of said RFID tag, signals from a RFID reader (100), and extracting from the received signals energy providing a supply voltage Vdd to the RFID tag;
  storing in at least one energy storage module of the RFID tag said extracted energy from the received signals of the RFID reader; and
  providing via a power output in connection with and supplied by a second communication module of the RFID tag a power-supply voltage to at least one external device (300) using said stored energy;
  tracking, by a control module of the RFID tag in connection with the second communication module and with the first communication module, the power-supply voltage provided by the power output to the at least one external device; and
  transmitting via the first communication module to the RFID reader a quality indicator of an energy status of the RFID tag based on a result of said tracking.

12. The method of claim 11, comprising continuously performing said tracking.

13. The method of claim 11, comprising periodically performing said tracking.

14. The method of claim 11, further comprising monitoring an ambient temperature or humidity of an area surrounding the RFID tag by at least one temperature sensor or humidity sensor included in the RFID tag.

* * * * *